(No Model.)
A. HALLER.
SALT EVAPORATING TANK.
No. 439,945. Patented Nov. 4, 1890.
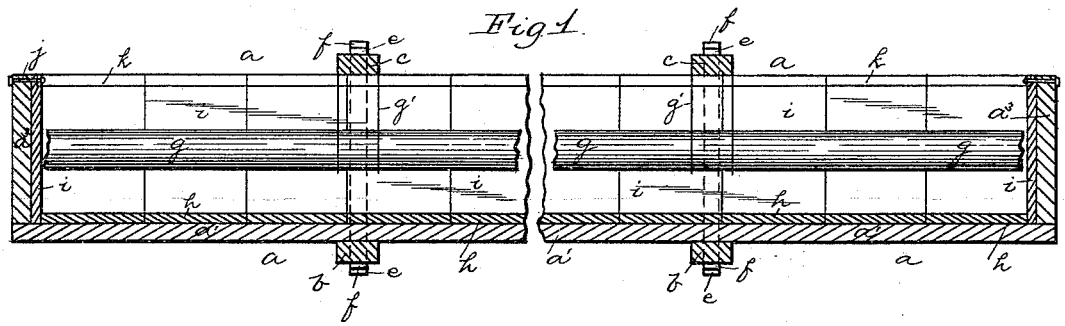
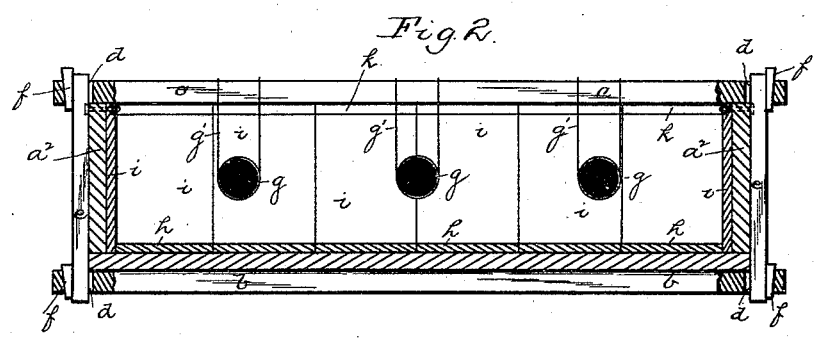
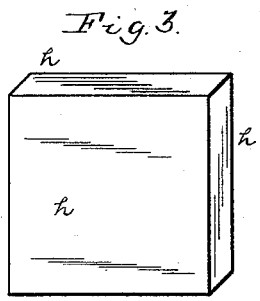
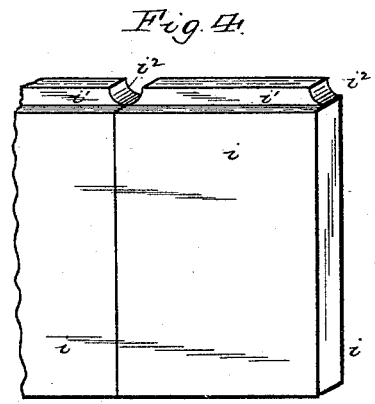
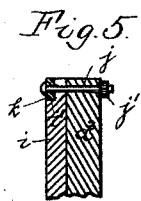
Witnesses:
J. M. Cooke
Robt O. Totten
Inventor,
Augustine Haller
By James D. Ray
Attorney

UNITED STATES PATENT OFFICE.

AUGUSTINE HALLER, OF PITTSBURG, PENNSYLVANIA.

SALT-EVAPORATING TANK.

SPECIFICATION forming part of Letters Patent No. 439,945, dated November 4, 1890.

Application filed January 30, 1889. Serial No. 298,077. (No model.)

*To all whom it may concern:*

Be it known that I, AUGUSTINE HALLER, a resident of Pittsburg, in the county of Allegheny and State of Pennsylvania, have invented a new and useful Improvement in Salt-Evaporating Tanks; and I do hereby declare the following to be a full, clear, and exact description thereof.

My invention relates to salt-evaporating tanks or grainers which receive the brine and in which the salt formed is deposited. The supply of salt is obtained from three sources—from rock salt in the crystalline state, from the evaporation of sea-water, or from the natural brine which flows or is pumped from springs or wells. From the latter source most of the coarse grades of salt are obtained, such as are used for the preservation of meats, fish, and other substances.

To obtain the salt from the natural brine the process most commonly employed is what is known in the trade as the "steam process," which consists in raising the brine to a high temperature by means of steam-heating pipes passing through the brine. This process is generally carried on in a long building with open sides to allow the escape of the steam arising from the brine and situated near the well or spring from which the brine is supplied. Within this building are arranged long narrow tanks side by side, extending the length of the building, said tanks being usually constructed of heavy timbers securely fastened together, so as to prevent as much as possible the escape of the brine and withstand the pressure due to the weight of the brine and the salt deposited in them. There are two classes of these tanks, one class being called the "purifying-tanks" and the other the "evaporating-tanks" or "grainers," the former being made deeper than the others and often wider but fewer in number than the evaporating tanks or grainers. The brine coming from the well or spring is first carried into the purifying-tank, and is heated by means of steam passing through copper pipes extending the entire length of the tank, said pipes being arranged parallel to each other, and usually three in number, although the number depends on the width of the tank. In this tank any of the impurities in the brine are collected and deposited on the bottom of said tank, when the brine, thus purified and concentrated, is then carried by suitable pipes to the evaporating or graining tanks, which are arranged close to the purifying-tanks and supplied with copper steam-heating pipes in the same manner. The brine is allowed to remain in said evaporating-tanks or grainers for about twelve hours, subject to the heat of the steam passing through the copper pipes, and the salt is crystallized and deposited on the bottom or floors of said tanks, whence it is removed by shovels, the tanks being made about two feet in depth to allow the workmen from platforms along the side of the tanks to conveniently remove the salt and pile it upon the draining-platforms above the tanks, whence any brine may drip into the tanks. As above stated, these evaporating-tanks or grainers are constructed of wood, and to these tanks as so constructed there are several serious objections. One of these objections is due to the action of the heat upon the bottom and sides of the tank, for, as the brine is raised to a high temperature, the steam-pipes are very hot, and this has the effect of burning and charring the wood, so that when the salt is removed by means of shovels and scrapers particles of charred wood will necessarily be removed, together with the salt, and be intermingled therewith. Again, the sharp edge of the shovels coming into contact with the bottom extracts slivers and splinters from the wood, so that it is impossible to procure the salt free from these particles of charred wood and splinters, while to expend time and labor in removing them would greatly add to the cost of the salt. The chemical action, too, of the brine during the evaporating process has an injurious effect on the wood, while the salt becomes hardened and adheres to the wood, so that with the above objections the life of an ordinary wooden tank or grainer is generally not more than three years.

The object of my invention, therefore, is to provide a lining for these evaporating-tanks or grainers which will not have the objectionable features of the wooden tanks and which will furnish the salt pure and clean.

To these ends my invention consists, generally stated, in combining with the grainer having wooden outer sides and bottom, constituting a trough, vertical tiles or slabs formed of clay, glass, or stone, held at the top against the wooden side walls by screws passing through grooves in the slabs, and like tiles or slabs resting on the bottom of the grainer and bearing against the lower edges of the side slabs.

It also consists in combining with the wooden tank or grainer side tiles having rabbets along their upper edges, a securing-strip fitting into said rabbets, and bolts securing the strip to the tank-body, all as hereinafter more specifically set forth and claimed.

To enable others skilled in the art to make and use my invention, I will describe the same more fully, referring to the accompanying drawings, in which—

Figure 1 is a longitudinal vertical section of a tank with my invention applied thereto. Fig. 2 is a cross-section. Fig. 3 is a perspective of one of the bottom tiles. Fig. 4 is a view of side tiles. Fig. 5 shows means of joining side tiles to the side of the tank.

Like letters of reference indicate like parts in each of the figures of the drawings.

The evaporating-tank or grainer $a$ is constructed of heavy timbers, forming the bottom $a'$, the sides $a^2$, and the ends $a^3$ thereof. These timbers may be joined together in any suitable manner, so as to allow as little as possible of the brine to leak from the tank. The manner of joining these timbers shown in the drawings is well suited to the purpose, in which the bottom pieces $a'$ are supported by and rest on cross-beams $b$ of suitable size, arranged at regular intervals and at such a distance from each other as to insure a strong support. The end pieces $a^3$ rest upon the faces of the bottom pieces $a'$, and the sides $a^2$ against the ends of the end pieces $a^3$ and against the side edges of the bottom piece, and in order to hold these pieces in position beams $c$ are placed across the tank, resting on the side pieces $a^2$, said beams $c$ being arranged directly above the beams $b$ and corresponding in size thereto. These beams $b$ and $c$ extend beyond the body of the tank $a$ and have in their ends the slots $d$, into which the uprights $e$ enter, while wedges $f$ are also driven into the slots $d$ to hold the uprights $e$ in position and to force the side pieces $a^2$ closer together, and, as said side pieces rest against the end pieces $a^3$, as the wedges $f$ are driven into the slots $d$ the tendency will be to hold the timbers close together.

Copper pipes $g$, supported by suitable hangers $g'$, are arranged within the tank $a$ at regular intervals apart and extending the entire length of the tank.

On the bottom $a'$, within the tank $a$, I place the square tiles $h$, which may be made of clay, glass, or may be cut from stone to the desired shape and size, said tiles being usually about twelve inches square and thick enough to withstand the wear to which they are subjected, two inches being about the proper thickness. The sides $a^2$ and ends $a^3$ are also lined with tiles $i$ of the same material, but somewhat larger than the bottom tiles, so that one tile will extend from the bottom to the top of the tank, and only one row of tiles is necessary. These tiles $i$ are rabbeted at their upper edges, as at $i'$, and recesses $i^2$ are formed at the upper corners, so that by means of bolts $j$, passing through said recesses $i^2$ and through corresponding bolt-holes in the sides $a^2$ and ends $a^3$, together with the nuts $j'$, the tiles $i$ are securely held in place and prevented from falling or being displaced. A strip $k$, of wood, copper, or other suitable material, is placed along the rabbet edge $i'$ to hold these tiles in place and prevent the head of the bolt $j$ from being directly in contact with the tile and wearing away the same and to give a bearing-face for the head of said bolt when the nut $j'$ is screwed up tight.

By this construction I obtain a tank lined on all sides with a smooth even material to which the salt will not adhere, as in the case of wooden tanks, and from which the salt can be readily removed, and one on which the heat will have no effect, as such tiles are non-conductors of heat and therefore protect the wood of the tank from injury thereby, and consequently the salt will be free from the particles of charred wood and splinters, which is the most objectionable feature in the use of the wooden tank. Nor will the chemical action of the brine have any effect on the tiles, as in the case of wood, so that a tank constructed in this manner will long outlast the wooden tank, and as the lining is composed of separate tiles, if one of said tiles either on the bottom or side becomes worn or defective for any reason, it may be readily removed and another inserted in its place with little trouble and delay.

As great quantities of the salt obtained by this process are used for the preservation of meats and fish and as food for animals, it is a matter of importance that it be pure and clean, and this was practically impossible where the wooden tank was employed. The advantages of a tank lined with tiles are readily apparent.

I am aware that fire-tiles have been used as linings for sulphuric-acid concentrators, in which two or more strata of tile were supported by backings or strata of sand, and therefore do not claim the use of tiles broadly. Such concentrator differs, however, from my invention, in which the tiles are supported by the wooden body of the tank resting directly against the same, so that a firm support for the tiles is provided, which will permit of the shoveling and other like work on the tiles and the side tiles and secured to the side walls of the tank.

What I claim as my invention, and desire to secure by Letters Patent, is—

1. The combination, with the wooden outer sides and bottom of a salt-grainer, constituting a trough, of vertical tiles or slabs formed of clay or its described equivalent held at the top against the wooden side walls by screws passing through grooves in the slabs, and like tiles resting on the bottom of the grainer and bearing against the lower edges of the side tiles, substantially as and for the purposes set forth.

2. In combination with a salt-evaporating tank, side tiles having rabbets along their upper edges, a securing-strip fitting into said rabbets, and bolts securing the strip to the tank-body, substantially as and for the purposes set forth.

3. In combination with a salt-evaporating tank, side tiles having rabbets along their upper edges and having recesses at the upper corners thereof, a securing-strip fitting within said rabbets, and bolts fitting within said recesses and securing the tiles to the tank-body, substantially as and for the purposes set forth.

In testimony whereof I, the said AUGUSTINE HALLER, have hereunto set my hand.

AUGUSTINE HALLER.

Witnesses:
J. N. COOKE,
F. G. KAY.